Sept. 18, 1934.  V. IVITSKY  1,973,710

LUBRICATED AXLE BEARING

Filed Aug. 14, 1931

Inventor:
Victor Ivitsky.

Patented Sept. 18, 1934

1,973,710

UNITED STATES PATENT OFFICE 1,973,710

LUBRICATED AXLE BEARING

Victor Ivitsky, London, England; Andrew Ivitsky, executor of said Victor Ivitsky, deceased Application August 14, 1931, Serial No. 557,115
In Great Britain September 9, 1930

9 Claims. (Cl. 308—117)

The present invention relates to an improved method and apparatus for lubricating the bearings of vehicles, especially of the fixed axle type with loose wheels. No satisfactory method of lubricating axle bearings of this type is presented by the prior art and it is an object of the invention to provide an efficient and reliable and at the same time inexpensive mode of lubrication for such axles.

The process as proposed in accordance with the present invention comprises the conducting of lubricant, before its introduction between wheel hub and axle, over means of smaller diameter than the diameter of the bearings. In this manner the lubricant is subjected to the action of centrifugal force and flows thus automatically and under pressure between the running surfaces of the bearings. The feature of the lubricant being under a certain pressure may be utilized,—in the further development of the process—in the following manner: In the way of the lubricant under pressure, preferably in the way of the lubricant returning from the bearings, purifying means, such as filters or similar means, are interposed. As purifiers, such as filters and similar means, always present a certain flow-resistance, they could not possibly be employed heretofore, although their adoption offers great advantages, as a method of applying sufficient pressure to overcome this resistance was not known. Such pressure is indispensable to force lubricant through such purifying means.

According to the present invention, the wheel hub, is made hollow and in the annular space therein is arranged a partition of conical or similar form to receive lubricant on a portion of smaller diameter than the diameter of the bearings, while another portion of this partition communicating with the former portion, and of larger diameter, feeds the lubricant to the bearings, i.e. with such arrangement, lubricant, before its introduction between the running surfaces, is conducted over a surface of smaller diameter than the diameter of the bearings and fed to the bearings under the influence of centrifugal force and pressure. The partition may suitably be of double conical shape with openings, slits or similar apertures in its portion of smallest circumference which is preferably arranged midway of its length, while the end portions of the double cone with largest diameter are adjacent to the bearings, and especially when slits are provided in the central portion of the double cone, these portions with largest diameter are supported within the wheel hub. Lubricant flows, in a manner which will be described in detail presently, through these openings, slits or similar apertures in the central portion of the double cone toward the axle and into the inner space of the latter, is thrown against the cone jacket by the action of centrifugal force and flows along the jacket to the portions of the cone with largest diameter and is then fed to the bearings under pressure of the continuous flow of lubricant. Special ducts are arranged which serve to return the lubricant from the bearings to a lubricant sump outside the aforementioned partition. From the sump, lubricant penetrates through the openings, slits or similar apertures into the inner lubricant chamber formed by the partition as just described.

It is of advantage to arrange a filtering or purifying device between the lubricant sump and the return ducts, such as e.g. perforated plates in combination with filtering means.

The admission of lubricant from the sump on the outside of the partition to the lubricant chamber on the inside of the partition does not offer any difficulties with vehicles running at lower travelling speeds, as lubricant will run freely, under the influence of its own gravity, through the apertures and slits in the wall which form the partition of the inner lubricant chamber. Lubricant runs to the bearings in the same manner, for, also under the influence of its own gravity, lubricant flows along the double conical jacket to the lower portions of the bearings. In order to ensure ample lubrication also with travel at higher speeds, the lubricant chamber is provided with scoops or a non-rotating element of disc or other suitable shape fixed to the axle in a manner to extend into the lubricant sump through a slit in the lubricant chamber. These scoops take lubricant direct from the sump and convey it to the lubricant chamber under a certain pressure.

The non-rotating element is not influenced by centrifugal force and at its farthest extensions retards lubricant which is consequently subjected to the influence of its own gravity and makes for the centre of such element and runs through the slit to the lubricant chamber, from where it circulates again in previously described manner.

By arranging radial ribs, fins or similar means, the described effect can be further intensified. The separation of foreign matter from the lubricant can also be improved by the provision of slits in that portion of the lubricant chamber which is largest in diameter and the action of centrifugal force will deliver all foreign matter through these slits. The annular space behind the slits can be cleaned out from time to time.

The present invention may be performed by way of example in accordance with the accompanying drawing wherein.

Figure 1:
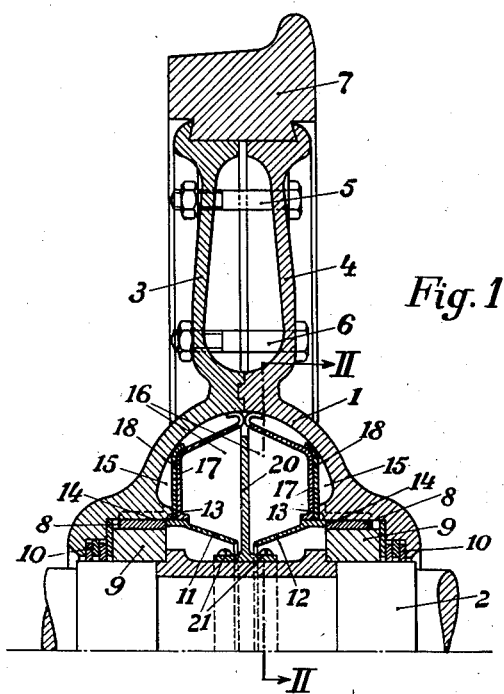
Fig. 1 is a vertical section through the centre of a loose wheel running on a fixed axle.

Referring to the accompanying drawing, 1 the hub of a loose wheel rotating on a fixed axle 2. The web of the wheel comprises two parts 3 and 4 which are clamped together by means of bolts 5 and 6, or in some similar suitable way, in such a manner that parts 3 and 4 serve at the same time for securing rim 7 of the wheel. The bearing surfaces are formed by annular bearing liners 8 fixed to hub 1 and bearing rings 9, shrunk on axle 2. To avoid all leakage of lubricant, the hub is provided with labyrinth packings 10, which are held in position by flanged boss projections.

In accordance with the present invention, the following lubricating device is arranged within hub 1: a double conical element comprising two separate cones 11 and 12 is provided within the hollow space of hub 1 in such a manner that the cone portions smallest in diameter face one another, while the larger ends are secured to annular projections 13 on hub 1. The double conical element may also consist of one single body. In that case, one may omit the slit like interspace between the cones (compare with 23, Fig. 3).

After performing its lubricating function, the lubricant leaves the bearing surfaces of 8 and 9 and is returned through ducts 14 to chambers 15, formed by the hub wall and vertical (to the axle) partitions 17 of sump 16. Partitions 17 are constructed in the form of perforated discs covered on their outer sides with filter-cloth 18 through which lubricant is presesd into the sump, (see Fig. 2). A non-rotating disc 20 is mounted on the fixed axle 2 and secured thereto at 21. This disc passes through a space between the two cones 11 and 12 and extends into sump 16.

The aforedescribed structure functions in the following manner:

Assuming that the wheels of a rail vehicle come to rest by brake action after a prolonged journey at higher speed. In this case, the centrifugal force abates which hitherto kept lubricant adhering to the outer walls of sump 16, in the form of a lubricant ring, and consequently, lubricant flows under the influence of gravity in the direction of the axle, penetrates through the annular slit between cones 11 and 12 into the inner lubricant chambers of the latter. From the inner lubricant chambers it flows downwards to the lower portions of these chambers and thus reaches the running surfaces of the parts 8 and 9, lubricating them while the vehicle comes gradually to a stop. This lubrication continues until the wheels come to final rest. Assuming that the wheels speed up from their position of rest, lubricant runs, in the first instance, again under the influence of its own gravity, into the inner lubricant chambers through the aforementioned slit between cones 11 and 12, and now, under the influence of centrifugal power, it travels along the interior surfaces of the cone jackets 11 and 12 in the direction of the cone portions of largest diameter. In this manner, lubricant is fed under pressure to the running surfaces of elements 8 and 9. Through ducts 14 lubricant returns to chamber 15, and, under super-pressure of continually arriving further quantities of lubricant, it is pressed through filter-cloth 18 back into sump 16. With increasing speed of the vehicle, the lubricant contained in sump 16 forms a lubricant ring into which dips non-rotating disc 20 on axle 2. Some portion of the lubricant is retarded by this disc and flows, under the influence of its own gravity, radially along disc 20 to axle 2 and arrives in this manner in the inner lubricant chamber of cones 11 and 12.

Figures 2, 3:
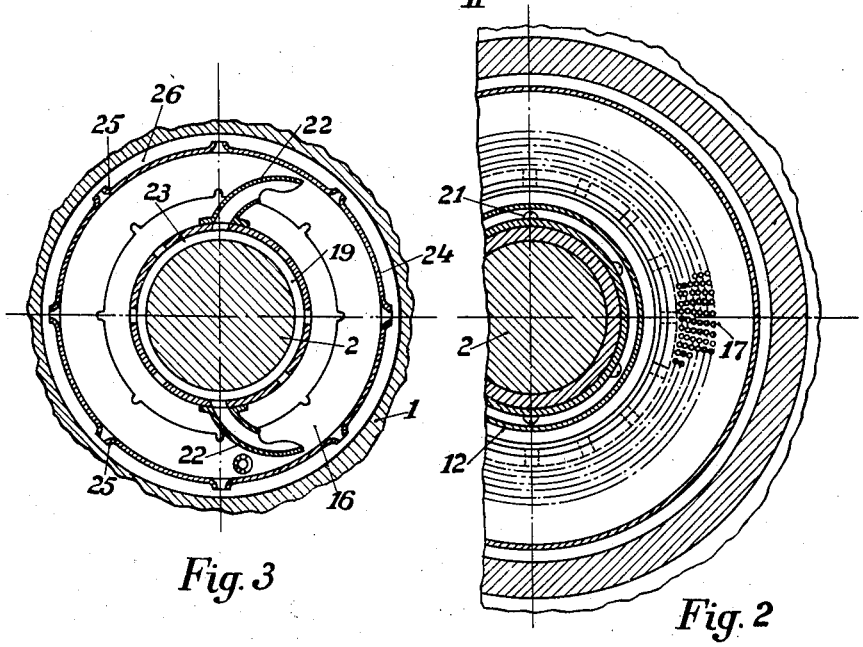
Fig. 2 is a plan view of the wheel along the line II—II of Fig. 1.
Fig. 3 shows a modified form of the structure shown in Fig. 2.

Fig. 3 corresponds to the construction of Figs. 1 and 2 with the one exception that elements 11 and 12 comprising the double cone are combined to form one single drum shaped body 23, contracted in its central circumference, where apertures are provided to admit lubricant arriving under the influence of its own gravity. The lubricant may reach such apertures and reach the space 19 either in accordance with the law of communicating tubes or by free fall at the instant that the force of gravity becomes greater than the centrifugal force as the speed of the vehicle falls. In addition, scoop-shaped elements 22 are provided on the contracted part of the circumference in a manner that the scoop openings oppose the direction of rotation of the lubricant ring which revolves with the wheel. At least one of these scoop-shaped elements is provided for each direction of rotation of the loose wheel. Thus, lubricant is forced under a certain pressure created by the rotation of the lubricant into the inner space of double cone 23, i.e. into lubricant chamber 19, from where it automatically circulates under pressure in the same manner as described in connection with Figs. 1 and 2.

In contradistinction to Figs. 1 and 2, an annular insertion 24 with nozzle shaped outlets 25 is mounted at the highest point of the dome of the hollow space in the hub. A ring shaped space 26 is thus developed between insertion 24 and the dome of the hub, where impurities contained in the lubricant arrive and settle after passing through the nozzle shaped outlets 25. Space 26 is cleaned out from time to time, by dismantling the web of the loose wheel.

Having now described in detail the nature of the present invention and the manner in which it is to be performed, I claim:

1. In a sliding bearing for vehicles with fixed axles and loose wheels, the combination with a wheel having a hollow space at its hub, of a bearing between the fixed axle and the wheel, a partition in said hollow space having a portion of smaller diameter than the bearing surfaces and a portion of larger diameter and adapted to receive lubricant along its inner wall and convey the same over the portion of smaller diameter to that of larger diameter and finally to the bearing through the action of centrifugal force, and a feeding device for lubricant arranged to feed lubricant to the space within said partition independently of the speed of rotation of the wheel.

2. In a sliding bearing for vehicles with fixed axles and loose wheels, the combination with a wheel having a hollow space at its hub, of a bearing between the fixed axle and the wheel a partition in said hollow space having a portion of smaller diameter than the bearing surfaces and a portion of larger diameter and adapted to receive lubricant along its inner wall and convey the same over the portion of smaller diameter to that of larger diameter and finally to the bearing through the action of centrifugal force, and a feeding device for lubricant arranged to feed lubricant to the space within said partition independently of the speed of rotation of the wheel, said partition being of double conical shape and having apertures in the central, contracted portion thereof.

3. In a sliding bearing for vehicles with fixed axles and loose wheels, the combination with a wheel having a hollow space at its hub, of a bearing between the fixed axle and the wheel, a partition in said hollow space having a portion of smaller diameter than the bearing surfaces and a portion of larger diameter and adapted to receive lubricant along its inner wall and convey the same over the portion of smaller diameter to that of larger diameter and finally to the bearing through the action of centrifugal force, and a feeding device for lubricant arranged to feed lubricant to the space within said partition independently of the speed of rotation of the wheel, said partition being of double conical shape and having apertures in the central, contracted portion thereof, the portions of largest diameter of said partition being secured to the wheel hub.

4. In a sliding bearing for vehicles with fixed axles and loose wheels, the combination with a wheel having a hollow space at its hub, of a bearing between the fixed axle and the loose wheel, said hub enclosing a sump for lubricant, ducts adapted to return lubricant from the bearing to said sump, a partition in said hollow space having a portion of smaller diameter than the bearing surfaces and a portion of larger diameter and adapted to receive lubricant along its inner wall and convey the same over the portion of smaller diameter to that of larger diameter and finally to the bearing through the action of centrifugal force, and a feeding device for lubricant arranged to feed lubricant to the space within said partition independently of the speed of rotation of the wheel.

5. In a sliding bearing for vehicles with fixed axles and loose wheels, the combination with a wheel having a hollow space at its hub, of a bearing between the fixed axle and the loose wheel, said hub enclosing a sump for lubricant, ducts adapted to return lubricant from the bearing to said sump, a partition in said hollow space having a portion of smaller diameter than the bearing surfaces and a portion of larger diameter and adapted to receive lubricant along its inner wall and convey the same over the portion of smaller diameter to that of larger diameter and finally to the bearing through the action of centrifugal force, and a feeding device for lubricant arranged to feed lubricant to the space within said partition independently of the speed of rotation of the wheel, and means for abstracting impurities from the oil interposed between the ducts and lubricant sump.

6. In a sliding bearing for vehicles with fixed axles and loose wheels, the combination with a wheel having a hollow space at its hub, of a bearing between the fixed axle and the loose wheel, said hub enclosing a sump for lubricant, ducts adapted to return lubricant from said bearing to said sump, a partition in said hollow space having a portion of smaller diameter than the bearing surface and a portion of large diameter adapted to receive lubricant along its inner wall and convey the same over the portion of smaller diameter to that of larger diameter and finally to the bearing through the action of centrifugal force, a feeding device for lubricant arranged to feed lubricant to the space within said partition independently of the speed of rotation of the wheel, and a filter interposed between said ducts and sump.

7. In a sliding bearing for vehicles with fixed axles and loose wheels, the combination with a wheel having a hollow space at its hub, of a bearing between the fixed axle and the loose wheel, said hub enclosing a sump for lubricant, ducts adapted to return the lubricant from the bearing to said sump, a partition in said hollow space having a portion of smaller diameter than the bearing surfaces and a portion of larger diameter and adapted to receive lubricant along its inner wall and convey the same over the portion of smaller diameter to that of larger diameter and finally to the bearing through the action of centrifugal force, a feeding device for lubricant arranged to feed lubricant to the space within said partition independently of the speed of rotation of the wheel, said partition having slits connecting the sump with the space within said partition, and means on the axle arranged to dip into the lubricant sump and passing through said slits in the partition.

8. In a sliding bearing for vehicles with fixed axles and loose wheels, the combination with a wheel having a hollow space at its hub, of a bearing between the fixed axle and the loose wheel, said hub enclosing a sump for lubricant, ducts adapted to return lubricant from the bearing to said sump, a partition in said hollow space having a portion of smaller diameter than the bearing surfaces and a portion of larger diameter and adapted to receive lubricant along its inner wall and convey the same over the portion of smaller diameter to that of larger diameter and finally to the bearing through the action of centrifugal force, a feeding device for lubricant arranged to feed lubricant to the space within said partition independently of the speed of rotation of the wheel, said partition having apertures connecting the sump with the space within the partition, and scoops associated with certain of said apertures and arranged to dip into the lubricant sump.

9. In a sliding bearing for vehicles with fixed axles and loose wheels, the combination with a wheel having a hollow space at its hub, of a bearing between the fixed axle and the loose wheel, said hub enclosing a sump for lubricant, ducts adapted to return lubricant from the bearing to said sump, a partition in said hollow space having a portion of smaller diameter than the bearing surfaces and a portion of larger diameter and adapted to receive lubricant along its inner wall and convey the same over the portion of smaller diameter to that of larger diameter and finally to the bearing through the action of centrifugal force, a feeding device for lubricant arranged to feed lubricant to the space within said partition independently of the speed of rotation of the wheel, and nozzle-shaped outlets in the lubricant sump, the walls of said sump being spaced from the inner walls of the hub to provide an annular recess outside said sump.

VICTOR IVITSKY.